Patented Aug. 25, 1931

1,820,141

UNITED STATES PATENT OFFICE

ALFRED CLAUDE JESSUP, OF CLAMART, FRANCE, ASSIGNOR TO BRITISH MAXIUM COMPANY LIMITED, OF LONDON, ENGLAND

PROCESS FOR THE PURIFICATION OF METALS

No Drawing. Application filed October 23, 1928, Serial No. 314,541, and in France November 7, 1927.

A process for purifying certain metals and in particular tin or copper, starting from waste products, has already been employed which consists in filtering the metals by making them pass in the molten state through a metal gauze of suitable gauge.

The coarsest impurities such as grains of sand or other foreign bodies are retained by the filter.

Attempts have already been made to apply this filtering process to the purification of magnesium or other like metals. For this purpose a preliminary agglomeration of the impurities into sufficiently large granules was effected by mixing up the bath of molten metal in the presence of a high proportion of an agglomerant or flux such as magnesium fluoride, magnesium chloride, ammonium chloride or even with the use of carbon dioxide giving certain combinations such as cyanamides. But these processes are not sure and permit only the use of very coarse filters (No. 20 mesh or even coarser still) and consequently generally allow a considerable proportion of oxides, oxychlorides, etc.; and other impurities to remain in the metal, which impurities are very objectionable.

The object of the present invention is to provide a process permitting metals, and in particular light metals, such as magnesium, aluminium, etc., to be filtered in very fine strainers, No. 20 to 120 mesh, and consequently to hold back the finest impurities without it being necessary to employ any other flux than those habitually employed.

This process consists in filtering the metal (for example, magnesium) through a metal gauze made of wires covered superficially with a substance having a sufficiently low melting point and particularly with an amalgam or any other alloy having a sufficiently low melting point such as alloy of tin, lead, bismuth and cadmium, or with pure metals such as tin, lead, copper, cadmium or bismuth.

By "sufficiently low melting point" is meant a melting point below 180° C.

Tests have shown that under these conditions the metal, for the same conditions of pressure passes without difficulty through very fine filters up to No. 120.

A further object of the invention is to provide a particular process for permitting an amalgam coated metal gauze giving good results to be obtained.

By way of a non-limiting example and for the purpose of enabling the present description to be understood, an embodiment of the invention is described hereinafter.

The filter formed by a metal gauze, for example of iron wire, etc., is first pickled and tinned by the usual methods; it is then covered with a layer of a suitable amalgam or alloy.

For this purpose the tinned gauze may advantageously be pickled in hydrofluoric acid. After pickling, the gauze is dipped into the amalgam or alloy, either in the cold or hot state (of course, while the amalgam or alloy is liquid). It is preferable to work in the hot state, the effect of which is to economize mercury.

As amalgam, use may be made of amalgams of metals the presence of which in small proportions in the filtering metal is of use, for instance amalgams containing cadium, manganese, tin, zinc, etc. An amalgam which gives excellent results for filtering magnesium is the following:

|  | Parts |
|---|---|
| Tin | 2 |
| Lead | 1 |
| Mercury | 1 |

It is to be noted that as the metal treated is filtered at a fairly high temperature, which for magnesium is in the order of 700° C., the greater part of the mercury existing at the surface of the metal gauze is volatilized and the final composition of the filtered metal is practically unchanged.

After the filtering operation the metal gauze retains the waste products and impurities such as chlorides, nitrides, oxides, oxychlorides, etc.

The invention includes by way of new industrial products, metallic filters covered with an amalgam or alloy having a very low melting point.

I claim:

1. Process of separating impurities carried by magnesium which comprises the step of passing the magnesium in the liquid state through a sifter the meshes of which are smaller than No. 20 and covered with a substance the fusion point of which is lower than that of the metal to be purified, the impurities thus being retained by the meshes of the sifter while allowing the magnesium to pass through.

2. Process of separating impurities carried by light metal which comprises the step of passing metal in the liquid state through a sifter the meshes of which are covered with a metallic substance the fusion point of which is lower than that of the metal to be purified, the impurities thus being retained by the meshes of the sifter while allowing the metal to pass through.

3. Process for separating impurities carried by magnesium metal consisting in passing metal in the liquid state through a sifter the meshes of which are covered with an alloy the fusion point of which is lower than that of the metal to be purified, the impurities thus being retained by the meshes of the sifter.

4. Process for separating impurities carried by light metal which comprises the step of passing the metal in the liquid state through a sifter the meshes of which are covered with an amalgam the fusion point of which is lower than that of the metal to be purified, the impurities thus being retained by the meshes of the sifter.

5. Process for separating impurities carried by magnesium metal which comprises the step of passing the metal in the liquid state through a sifter the meshes of which are smaller than No. 20 covered by an amalgam the fusion point of which is lower than that of the metal to be purified, the impurities being thus retained by the mesh of the sifter, the said amalgam being constituted of about two parts tin, one part lead and one part mercury.

6. Process for separating impurities carried by magnesium metal which comprises the step of passing the metal in the liquid state through a sifter the meshes of which are covered with a metal the fusion point of which is lower than that of the metal to be purified, the impurities being thus retained by the mesh of the sifter.

7. Process for separating impurities carried by light metal consisting in taking a metallic sifter through which the metal is to be passed, cleaning this sifter, tinning the sifter, cleaning it again, immersing it in an amalgam the fusion point of which is lower than that of the metal to be filtered, pouring upon this sifter thus prepared the molten metal to be filtered, whereby said metal will traverse said sifter substantially free from its impurities.

8. Process for separating impurities carried by magnesium metal consisting in taking a metallic sifter finer than a No. 20 mesh, through which the metal is to be passed, cleaning this sifter, tinning the sifter, cleaning it again with hydrofluoric acid, immersing it in an amalgam the fusion point of which is lower than that of the metal to be filtered, pouring upon this sifter thus prepared the molten metal to be filtered, whereby said metal will traverse said sifter substantially free from its impurities.

9. A strainer for molten metal the metallic wires of which the strainer is composed, being covered superficially with an alloy having a melting point substantially below that of magnesium.

10. The process for separation of impurities from light metals consisting in causing the molten metal to pass through the meshes of a sieve covered with a metal substance which melts under the action of the heat liberated by the liquid metal bath.

11. The process for separating impurities from a bath containing magnesium consisting in causing the molten magnesium to pass through the meshes of a sieve covered with a metallic substance whose fusion point is below 300° C.

12. Process according to claim 10 in which the metallic substance covering the meshes of the sieve is an alloy.

13. Process according to claim 10 in which the metallic substance covering the meshes of the sieve is an alloy in which one of the constituents volatilizes when brought in contact with molten magnesium.

14. Process according to claim 10 in which the metallic substance covering the meshes of the sieve is an amalgam.

15. Process according to claim 10 in which the metallic substance covering the meshes of the sieve is an amalgam of two parts tin, one part lead and one part mercury.

16. Process for the preparation of sieves for the separation of impurities according to claim 10, consisting in cleaning the meshes of the said sieve and in covering them with a metallic substance which can be melted by the heat carried by the liquid metal to be filtered.

17. Process for the preparation of sieves for the separation of impurities according to claim 10, consisting in cleaning the said sieve, tinning it, cleaning it again with hydrofluoric acid and thereafter in immersing it in an amalgam which can be melted by contact of molten magnesium therewith.

18. The process for separating impurities from a bath containing magnesium consisting in causing the molten magnesium to pass through the meshes of a sieve covered with a metallic substance whose fusion point is not substantially above 180° C.

In testimony whereof I have signed this specification.

ALFRED CLAUDE JESSUP.